June 11, 1940. S. W. ALBRIGHT 2,204,390
HACKSAW
Filed May 26, 1938
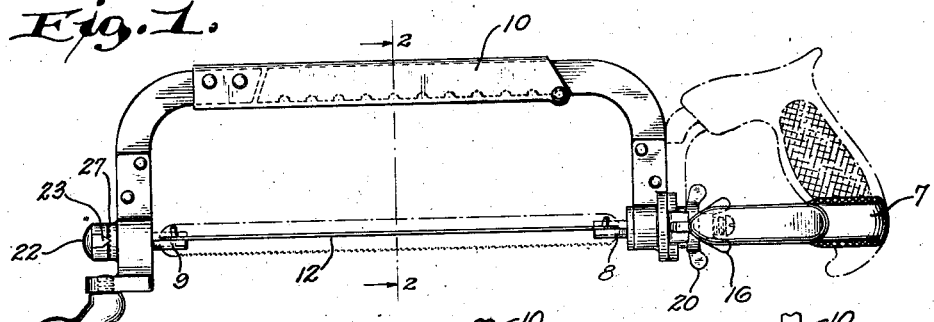
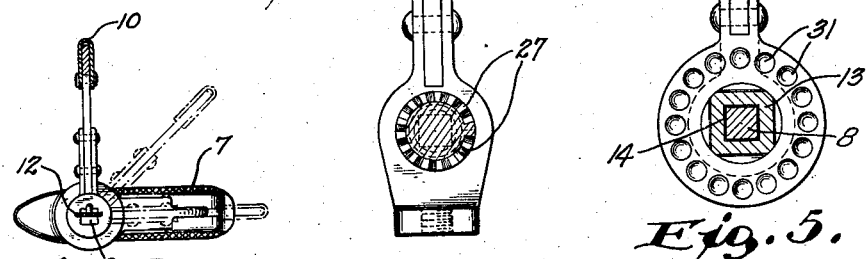
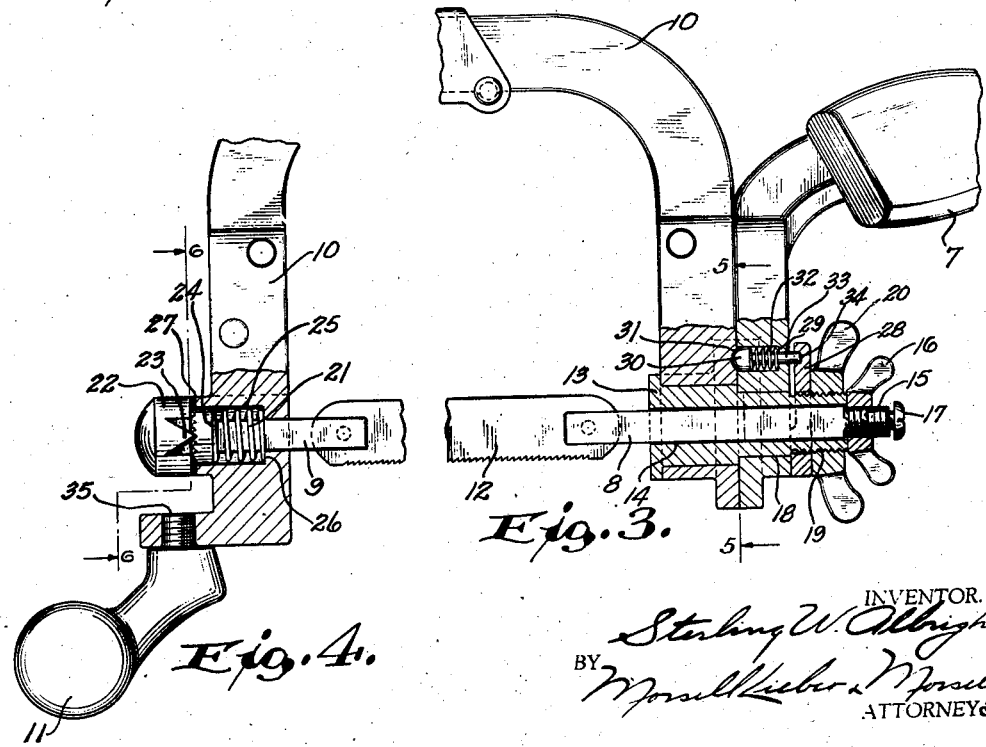
INVENTOR.
Sterling W. Albright
BY
ATTORNEYS.

Patented June 11, 1940

2,204,390

UNITED STATES PATENT OFFICE 2,204,390

HACKSAW

Sterling W. Albright, Racine, Wis.

Application May 26, 1938, Serial No. 210,096

4 Claims. (Cl. 145—33)

My present invention relates generally to improvements in saws, and relates more specifically to improvements in hacksaws having a frame adapted for angular adjustment with respect to the blade and handle.

I am aware that adjustments of this general type have heretofore been proposed in hacksaws. However, in the majority of these prior structures the adjustments for the blade and handle are separate and distinct from one another, and two separate manipulations are required, and in addition the handle is out of axial alinement with the blade. When the hacksaw is being used in the normal position with the frame disposed above and in the plane of the saw blade, then it is not necessary that the handle be in axial alinement with the saw blade. In an adjustable construction, however, if the blade is disposed for sawing in a vertical plane and if the frame is disposed in a substantially horizontal plane, then if the handle is out of axial alinement with the saw blade, the sawing pressure will not be applied in the same plane as the plane of the saw cut being made. As a result there will be a tendency to twist the saw blade in the saw cut, and with the highly tempered blades now employed breakage is very likely to result. In those prior structures in which the blade and handle are in axial alinement and are simultaneously adjustable, the handle is substantially integral with the saw blade, and there is a very weak connection between the handle and the frame. There is therefore the tendency for the handle to shift angularly with respect to the frame, thereby twisting the blade with resulting breakage.

It is therefore an object of the present invention to provide an improved hacksaw wherein the frame is angularly adjustable with respect to the blade and handle, to meet varying conditions, and wherein the handle is supported in axial alinement with the blade, there being means for rigidly connecting the handle to the frame, in any desired position of adjustment which positively prevents the handle from shifting with respect to the frame during use, so that there will be no twisting of the blade.

A further object of my present invention is to provide a hacksaw having an improved means for angularly adjusting the frame with respect to the blade and handle portions thereof and to provide a means for maintaining correct balance of the saw irrespective of the angular position of said frame.

A further specific object of my invention is to provide an improved means for adjusting the frame portion of a hacksaw in various desired angular positions with respect to the handle and blade portions of the saw and to provide a counterweight thereon for the purpose of counterbalancing the frame portion regardless of the position thereof.

A still more specific object of my present invention is to provide an improved means of angular adjustment of the frame of a hacksaw about the common axis of the blade and handle by simple manipulation of thumb nuts, without removal of the blade or handle from the saw and without removing said saw from the object being cut, and at the same time maintaining proper balance of said saw regardless of the position of the frame thereof.

An additional specific object of my invention is to provide an improved means for effecting angular adjustment of the frame of a hacksaw about the common axis of the blade and handle portions by simple manipulation of thumb nuts which also provide for positive locking of said frame in the desired position, and a counterweight providing proper balance of the saw irrespective of the position of the frame.

These and other specific objects and advantages will be apparent from the following detailed description.

A clear conception of embodiments of the several features constituting the present invention may be had by referring to the drawing accompanying and forming a part of this specification, wherein like reference characters designate the same or similar parts in the various views.

Fig. 1 is a top view of the saw and blade showing the frame angularly adjusted and locked at a right angle with respect to the plane of the blade and handle, and also showing the handle and blade disposed in the plane of the frame, in dot-and-dash lines;

Fig. 2 is a transverse section through the saw taken along the line 2—2 of Fig. 1, and showing in dot-and-dash lines other positions of adjustment of the frame;

Fig. 3 is an enlarged fragmentary part sectional side view of the adjusting portion of the saw showing also the locking means provided at the handle portion of the saw;

Fig. 4 is a similarly enlarged fragmentary part sectional side view of the locking mechanism at the end of the blade remote from the handle, and also showing the counterweight;

Fig. 5 is a transverse section taken along the line 5—5 of Fig. 3 showing a part of the locking means; and Fig. 6 is a section showing another part of the locking means at the opposite end taken along the line 6—6 of Fig. 4.

While I have illustrated my invention herein as being specifically applied to hacksaws, it is not my intention to thereby unnecessarily restrict the scope, since it may be applicable to other types of saws.

Referring to the drawing, and more specifically to the complete assemblage shown in Fig. 1, there is shown a handle 7 carrying a blade support 8 adapted for cooperation with the support 9 to support a saw blade 12 therebetween, a U-shaped frame 10 carrying a counterweight 11, said frame and counterweight being adjustably movable about the blade supports 8 and 9 as will hereinafter be pointed out in detail.

Fig. 3 shows the adjusting nuts and the locking device at the handle end of the saw. The blade support 8 is slidably but non-rotatably carried within the stud 13 through a square bore 14 and is adjustable at the threaded end 15 by manipulation of the nut 16. By manipulation of this adjusting nut 16, the blade support 8 is movable axially of the bore 14 to relieve or increase the tension on the saw blade 12 as desired. The screw 17 has a sufficiently large head to prevent the nut 16 from normally coming off of the blade support shaft 8 and may be removed for purposes of disassembling the mechanism for cleaning and the like. The stud 13 is journaled within the frame 10 and is non-rotatably extended through a square bore 18 in the handle 7 and has a threaded portion 19 at one end adapted to carry the adjusting nut 20.

In Fig. 4, the blade support 9 has a head 22 having locking teeth 23 and a portion 24 of reduced diameter forming a shoulder. A spring 21, compressed within the bore 25 of the frame 10, presses against the frame at the shoulder 26 and against the shoulder of the reduced part 24 of the blade support head to continuously exert tension upon the blade 12 through the blade support 9 which is rotatable within the frame 10. As the adjusting nut 16, in Fig. 3, is loosened the compressed spring 21, in Fig. 4, pushes against the portion 24 of the blade support head 22 to force the locking teeth 23 out of engagement with the serrations 27 of the frame 10, thus unlocking the end of the frame 10 remote from the handle 7 and enabling rotation thereof about the blade support 9.

Again referring to Fig. 3, the frame 10 may be adjusted at the handle end of the saw by loosening the adjusting nut 20 while the nut 16 is loose, thus releasing the pressure on the collar 28 which is loosely carried upon the stud 13. The collar 28 has a recess 34 into which the unheaded end of the pin 29 is fitted and at which point pressure is exerted by the collar 28 upon the pin 29 when the adjusting nut 20 is tight. The locking pin 29 has a round head 30 adapted to fit into a selected recess 31 of the frame 10. This pin 29 is located within the handle 10 and carries a compressed spring 32 which presses against the flange 33 within the handle 10 and against the head 30 of the pin 29 tending to constantly force the head 30 into the selected recess 31. After the pressure of the collar 28 upon the pin 29 is released by loosening the adjusting nut 20 as above mentioned, the frame 10 at the handle end of the saw also becomes unlocked and the entire frame 10 may be rotated in any direction about the blade supports 8 and 9 and may subsequently be locked in any desired position by merely tightening the adjusting nuts 20 and 16. The counterweight 11 shown in Fig. 4 is secured to the frame 10 at a point remote from the handle 7. It is adapted to be screwed into the frame 10 as at 35 to enable quick removal therefrom in case such removal is desired.

It is apparent that with the above construction, when the hack saw is adjusted to the full line position of Figure 1, that the handle 7 is so positioned that pressure is applied in the same plane as the plane of the sawing action, and this is true in any position of adjustment. The locking means is such that if the nuts 16 and 20 are properly tightened, that the handle is rigidly anchored to the frame 10 so that no turning of the handle with resulting twisting of the saw blade is permitted during use regardless of the strains encountered.

When the hacksaw is in the adjusted position of Figure 1, there would normally be a tendency for the weight of the frame 10 to exert a twisting action on the saw blade. By use of the counterweight 11, however, the weight of the frame 10 is balanced on the other side so that no twisting action takes place. The counterweight is readily removable when its use is not necessary.

Notwithstanding the fact that the axis of the handle is common to the axis of the saw blade supports, nevertheless due to the fact that the saw support 8 is slidable in the aperture 14 it is possible to adjust the tension on the saw blade or remove and replace the saw blade without disturbing the lock between the frame and handle.

It should be understood that it is not desired to limit this invention to the exact details of construction or to the precise mode of operation, herein shown and described, for various modifications within the scope of the claims may occur to persons skilled in the art.

I claim:
1. In a hacksaw having a U-shaped frame, a blade support projecting inwardly from one end of said frame, a stud journaled in the other end of said frame and having a part projecting outwardly therefrom, said projecting part having a squared portion and having an outer threaded portion, and said stud having a squared bore extending therethrough, a squared blade support extending through said squared bore, the inner end of said support being cooperable with the blade support at the other end of the frame to support a saw blade therebetween, and the outer end of said blade support projecting beyond the outer end of the stud and being threaded, a handle having a squared aperture through which the squared portion of the stud extends, a nut threaded on the threaded portion of the stud for locking said handle in a desired angular position with respect to the frame, and a nut threaded on the outer end of the blade support for moving the latter axially to apply tension to the blade.

2. In a hacksaw having a U-shaped frame, a blade support projecting inwardly from one end of said frame, a stud journaled in the other end of said frame and having a part projecting outwardly therefrom, said projecting part having a squared portion and having an outer threaded portion, and said stud having a squared bore extending therethrough, a squared blade support extending through said squared bore, the inner end of said support being cooperable with the blade support at the other end of the frame to support a saw blade therebetween, and the outer end of said blade support projecting beyond the outer end of the stud and being threaded, a handle having a squared aperture through which the squared portion of the stud extends and having a pin projecting inwardly therefrom, there being a circular series of recesses in the adjacent frame portion for cooperation with said pin, a nut threaded on the threaded portion of the stud for locking said handle in a desired angular position with respect to the frame with the pin in a selected recess, and a nut threaded on the outer end of the blade support for moving the latter axially to apply tension to the blade.

3. In a hacksaw having a U-shaped frame, a blade support projecting inwardly from one end of said frame, a stud journaled in the other end of said frame and having a part projecting outwardly therefrom, said projecting part having a squared portion and having an outer threaded portion, and said stud having a squared bore extending therethrough, a squared blade support extending through said squared bore, the inner end of said support being cooperable with the blade support at the other end of the frame to support a saw blade therebetween, and the outer end of said blade support projecting beyond the outer end of the stud and being threaded, a handle having a squared aperture through which the squared portion of the stud extends and having a yieldingly mounted pin projecting inwardly therefrom, there being a circular series of recesses in the adjacent frame portion for cooperation with said pin, a nut threaded on the threaded portion of the stud for locking said handle in a desired angular position with respect to the frame with the pin in a selected recess, and a nut threaded on the outer end of the blade support for moving the latter axially to apply tension to the blade.

4. In combination, a hacksaw having a U-shaped frame provided with releasable locking means at one end and a plurality of indexing recesses at the opposite end, a blade support rotatably cooperable with each end of said frame and adapted to carry a blade therebetween, a handle at the recessed end of said frame adjustably mounted with respect thereto and non-rotatably connected to one of said blade supports and having a common axis therewith, said handle having a yieldingly mounted rounded projecting pin adapted to snap into and out of said frame recesses, means providing for axial movement of said blade supports with respect to said handle and said frame, means located at the handle end of said frame for positively locking the pin of said handle in a selected recess of said frame against yielding movement to maintain the desired angular relationship between the frame and handle and to simultaneously fix the angular position of the blade with respect to the frame, and means also located at the handle end of said frame for adjusting the tension on the saw blade and for simultaneously locking the blade at both ends with respect to said frame by moving the blade support axially with respect to the handle and frame.

STERLING W. ALBRIGHT.